United States Patent [19]

Poppe et al.

[11] 4,035,325

[45] July 12, 1977

[54] USE OF ORGANOMETALLIC SALTS AND METAL DEACTIVATORS AS FLAME RETARDANTS FOR POLYOLEFINS

[75] Inventors: Wassily W. Poppe, Lombard; Ivor R. Fielding, Naperville, both of Ill.

[73] Assignee: Standard Oil Company (Indiana), Chicago, Ill.

[21] Appl. No.: 586,966

[22] Filed: June 16, 1975

[51] Int. Cl.² .......................................... C08K 5/59
[52] U.S. Cl. .................... 260/23 H; 260/45.7 R; 260/45.75 B; 260/45.75 M; 260/45.75 W; 260/45.75 R; 260/45.8 NT; 260/45.9 NC
[58] Field of Search ............. 260/45.75 R, 45.75 B, 260/45.75 W, 45.75 M, 45.8 NT, 45.9 NC, 45.7 R, 23 H; 428/379

[56] References Cited

U.S. PATENT DOCUMENTS

| | | | |
|---|---|---|---|
| 3,318,841 | 5/1967 | Tomlinson et al. | 260/45.75 |
| 3,326,832 | 6/1967 | Rauschenbach et al. | 260/45.75 R |
| 3,403,118 | 9/1968 | Listner | 260/45.7 P |
| 3,418,263 | 12/1968 | Hindersinn | 260/23 H |
| 3,419,518 | 12/1968 | Mahling | 260/45.7 R |
| 3,475,372 | 10/1969 | Gable | 260/45.75 |
| 3,549,572 | 12/1970 | Minagawa et al. | 260/45.8 NT |
| 3,576,784 | 4/1971 | Gloor | 260/45.8 NT |
| 3,629,189 | 12/1971 | Minagawa et al. | 260/45.8 NT |
| 3,734,885 | 5/1973 | Muller et al. | 260/45.7 |
| 3,806,358 | 4/1974 | Glander et al. | 260/45.9 NN |
| 3,845,001 | 10/1974 | Mitchell | 260/45.75 R |
| 3,884,874 | 5/1975 | Rosenberger et al. | 260/45.9 NN |
| 3,956,139 | 5/1976 | Whelan | 260/45.75 M |

*Primary Examiner*—V. P. Hoke
*Attorney, Agent, or Firm*—Stanley M. Welsh; Arthur G. Gilkes; William T. McClain

[57] ABSTRACT

The effectiveness of combinations comprising an antimony compound and a halogen-containing compound for reducing the flammability of polyolefins is increased significantly by the addition of certain organometallic compounds and/or compounds which are used as metal deactivators and which contain the chemical structure of either a substituted hydrazine or a substituted 3-amino-1,2,4-triazole amide.

14 Claims, No Drawings

USE OF ORGANOMETALLIC SALTS AND METAL DEACTIVATORS AS FLAME RETARDANTS FOR POLYOLEFINS

BACKGROUND OF THE INVENTION

Flame resistant polyolefin compositions have been obtained heretofore by incorporating various additives. To be effective, an additive must promote suitable levels of flame resistance without causing inordinate sacrifices in the appearance, processing, mechanical properties, and economics of the flame resistant composition. Additives disclosed by the prior art include, halogenated organic compounds, and various combinations thereof. One such additive combination is described by Monroe in U.S. Pat. No. 3,216,960 (1965) wherein an organic pyrophosphate, a halogenated organic compound, and an inorganic additive are intimately mixed, in specified concentrations, with polypropylene to produce a flame resistant composition.

The prior art has also disclosed a flame resistant composition which is produced by mixing with polypropylene, an inorganic compound containing antimony and a halogenated organic compound in fixed proportions to each other and to the polypropylene. Such combinations have found wide use in flame resistant polypropylene compositions, in part because there is a synergistic action within such combinations. Said synergistic action is shown by a greater increase in oxygen index (hereinafter defined) when said combination is used than is achieved when the halogenated organic compounds or inorganic compounds are used alone. Antimony trioxide is commonly used as the inorganic component of such combinations. Examples of polyhalogenated organic compounds that are known to be useful in combination with an antimony compound so as to impart flame retardancy to resinous polyolefin compositions containing them are to be found in U.S. Pat. No. 3,275,596 (1966), U.S. Pat. No. 3,403,036 (1968), U.S. Pat. No. 3,419,518 (1968), and U.S. Pat. No. 3,738,958 (1973). These form part of a class to be later referred to as a flame retardant package containing an antimony compound such as $Sb_2O_3$. Typical of such halogenated organic compounds are hexabromocyclododecane (HBCD), chlorinated paraffins, tetrabromophthalic anhydride (TBPA), and tetrabromoterephthalic acid (TBTA).

The greatest problem associated with the use of the aforesaid prior art additives involves the high additive concentrations necessary to effect suitable degrees of flame resistance. It is not uncommon for a flame resistant polypropylene composition to contain, by weight, 40% additives. In addition to the high cost of such flame resistant compositions, the use of high additive concentrations is generally accompanied by processing difficulties. For example, aliphatic and cycloaliphatic compounds containing bromine require lower extrusion temperatures (400° F maximum) than for brominated aromatic compounds. Although aromatic compounds containing bromine can be processed at higher temperatures, they are less effective than aliphatic compounds as flame retardants. Chlorine containing additives tend to decompose, liberating hydrochloric acid which corrodes processing equipment.

BRIEF DESCRIPTION OF THE INVENTION

We have found that the effectiveness of flame retardent combinations, comprising an antimony compound such as $Sb_2O_3$ and halogen-containing compounds such as HBCD, chlorinated paraffins, TBPA, and TBTA, is significantly increased by the addition of certain organometallic compounds and/or compounds which act as metal deactivators and which contain the chemical structure of either substituted hydrazines or substituted 3-amino-1,2,4-triazole amides. Metal deactivators are compounds which, when added to resins used to coat a particular metal such as copper wire, tend to inhibit the breakdown of said resin when ions from the metal diffuse into said coating. Said metal deactivators do not themselves contain any metal and are generally purely organic in nature, with an ability to chelate with said metal ions or in some other way inhibit the metal's otherwise present ability to catalyze the degradation of the polypropylene resin coating.

Experimentally, the effectiveness of an additive in reducing a plastic's flammability may be determined by using the Oxygen Index Method, ASTM D-2863-70. The oxygen index of a material is defined to be the minimum gas volume percent concentration of oxygen in a slowly rising mixture of oxygen and nitrogen that will just support combustion of the material. The higher is the oxygen index of a material, the lower is that material's flammability.

In sum, certain organometallic compounds both covalent and ionic in nature and/or metal deactivator compounds (hereinabove defined) have been found to increase substantially the oxygen index of polypropylene resins, copolymer resins of propylene and ethylene, polystyrene and polyethylene when such resins contain antimony compounds and halogen containing compounds.

DETAILED DESCRIPTION OF THE INVENTION

Several combinations of halogenated organic compounds and at least one antimony compound (hereinafter referred to as a flame retardant package containing an antimony compound) have been found to become more efficient flame retardants as measured by the oxygen index method when our discovered additives are incorporated. Several typical flame retardant packages containing an antimony compound which were investigated are given in Table 1. It should be noted that these are merely particular examples which indicate the genus of flame retardant packages which as a class employ $Sb_2O_3$, and that the examples of Table 1 employ a three component system comprising:

1. an antimony compound such as antimony trioxide;
2. a brominated organic compound; and
3. a chlorinated organic compound.

However, two component systems employing just $Sb_2O_3$ and a halogenated organic compound are known also to be effective U.S. Pat. No. 3,419,518 (1968). From a cost point of view chlorinated organic compounds are preferred over brominated organic compounds; but from an effectiveness point of view, brominated organic compounds are preferred over chlorinated organic compounds. In general, a trade-off is practiced wherein a mixture of brominated and chlorinated organic compounds are employed, such as utilized herein.

The main attributes of these halogenated organic compounds are:

a. a substantial non-volatility from the polymer matrix at the approximate melting point of the flammable polymer composition into which the flame retardant package is blended to insure the presence of these halogenated compounds in the final extruded product;
b. a gram molecular weight above 200; and
c. a halogen content in percent by weight of the halogenated compound in the range 35–93%.

Table 1

|  | Percent by Weight | Designated Hereinafter as |
|---|---|---|
| $Sb_2O_3$ | 3 | |
| HBCD | 4 | A |
| Chlorowax 70S | 2 | |
| $Sb_2O_3$ | 3 | |
| TBPA | 10 | B |
| Chlorowax 70S | 2 | |
| $Sb_2O_3$ | 3 | |
| TBTA | 10 | C |
| Chlorowax 70S | 2 | |
| $Sb_2O_3$ | 3 | |
| HBCD | 4 | D |
| Dechlorane Plus 25 | 2 | |

To retard oxidation and degradation by light, all flame resistant polymer compositions were equally stabilized with a stabilization package E, of approximately .80% by weight based upon the total composition.

| | |
|---|---|
| 0.10% Butylated hydroxytoluene (BHT) | |
| 0.36% Argus Q328 | E |
| 0.15% Epon 1002 (epoxy resin) | |
| 0.15% Calcium Stearate | |

Some raw material used hereinafter in the various formulations are:

Polypropylene powder having an average molecular weight of approximately 450,000, and flow rate of 2–4 grams/10 minutes as determined per ASTM D-1238 following Procedure A and Condition L;

Chlorowax 70S, a chlorinated paraffin sold by Diamond Shamrock Chemical Company containing approximately 69% chlorine, having a ball and ring softening point of 102° C, and a specific gravity of 1.63;

Dechlorane Plus 25 obtained from Hooker Chemical Corporation having approximately 65.1% chlorine, a density of 1.80 gm./cc., a melting point of 350° C, and a vapor pressure at 197° C equal to .006 mm of Hg;

GI09-367 (to be discussed in more detail hereinafter) obtained from Ciba-Geigy;

Mark 1475 (to be discussed in more detail hereinafter) obtained from Argus;

BHT obtained from Eastman Kodak;

Argus Q328 obtained from Argus being a mixture of distearyl thiodipropionate and the three to one condensate of 3 methyl-6 tertiary butyl phenol with crotonaldehyde;

Epon 1002 obtained from Shell being an epoxy resin having a melting point of from 75 to 85° C and an epoxide equivalent, in grams of resin containing one gram equivalent epoxy, of 600 to 700;

Mark QED obtained from Argus having a percent by weight of Ca, Zn, C, and H of 0.06, 4.7, 57.94, and 8.15%, respectively;

Advastab CZ-19 obtained from Cincinnati Milacron having a percent by weight of Ca, Zn, C and H of 0.89, 3.1, 64.49 and 10.52%, respectively; and Advastab CZ-22 obtained from Cincinnati Milacron having a percent by weight of Ca, Zn, C and H of 1.00, 2.10, 72.78 and 11.87%, respectively.

All resin compositions were prepared by weighing out a stabilization package, various fire retardant additives, and polypropylene powder, and by mixing in a Waring Blendor. Each batch was extruded on a one inch pelletizing screen extruder having a ⅛ inch strand die maintained at a temperature of 400° F. Incidentally, it was here found that additives containing any water of hydration could not be extruded. Test specimens were molded on a Frohring Minijector at 400°–420° F.

The Oxygen Index of various specimens were determined following ASTM D-2863-70.

EXAMPLE 1 — Zinc Compounds

The effectiveness of zinc compounds as additives to increase the oxygen index substantially of stabilized polymer compositions utilizing flame retardant packages containing an antimony compound is demostrated by examples involving zinc stearate, zinc borate, zinc dibutyl dithiocarbamate, zinc pentamethylene dithiocarbamate, Advastab CZ-19, Advastab CZ-22, and Mark QED.

An effect upon oxygen index of some zinc compound additives is observable when concentrations as low as .01% in weight percent are used. Zinc compounds having concentrations in weight percent as high as 10% are of practical effectiveness. In practice, concentrations of approximately 5% are preferred.

Table 2 consists of compositions tested in the manner hereinabove described. As a guide to evaluating the significance in changes to oxygen index, there are provided several reference compositions containing A, B, C, or D but without any additives.

Table 2

| | Zinc Compounds | |  |
|---|---|---|---|
| Zinc Compound and % by Weight | Polypropylene and E, % by Weight | Flame Retardant Package Containing an Antimony Compound Designated by letter and % by Weight | Oxygen Index |
| 0 | 73.0% | A 27% | 31.7 |
| 0 | 91% | A 9% | 27.9 |
| 0.8% Zinc Stearate | 90.2% | A 9% | 35.1 |
| 0 | 85% | B 15% | 25.3 |
| 0.8% Zinc Stearate | 84.2% | B 15% | 26.1 |
| 0 | 85% | C 15% | 25.8 |
| 0.8% Zinc Stearate | 84.2% | C 15% | 26.1 |
| 0.8% Zinc Borate | 90.2% | A 9% | 34.4 |
| 1.0% Zinc Dibutyl Dithiocarbamate | 90.0% | A 9% | 34.4 |
| 1.0% Zinc Pentamethylene Dithiocarbamate | 90.0% | A 9% | 35.9 |
| 0 | 91% | D 9% | 28.4 |
| 1.0% Advastab CZ-19 | 90% | A 9% | 30.0 |
| 1.0% Advastab CZ-22 | 90% | A 9% | 30.0 |
| 1.0% Mark QED | 90% | A 9% | 29.4 |

EXAMPLE 2 — Cobalt Compounds

The effectiveness of cobalt compounds as additives to increase the oxygen index substantially of polymer compositions utilizing flame retardant packages containing an antimony compound is demonstrated by examples involving cobalt stearate, cobalt naphthenate, and cobalt (III) acetylacetonate.

An effect upon oxygen index of some cobalt compound additives is observable when concentrations as low as .01% in weight percent are used. Concentrations of cobalt compounds in weight percent as high as 10% are of practical effectiveness. In practice, concentrations of approximately 5% are preferred.

Table 3 consists of compositions tested in the manner hereinabove described. Recourse to Table 2 is useful to gauge the significance in changes to oxygen index.

Table 3

Cobalt Compounds

| Cobalt Compound and % by Weight | Polypropylene and E, % by Weight | Flame Retardant Package Containing an Antimony Compound Designated by Letter and % by Weight | Oxygen Index |
| --- | --- | --- | --- |
| 0.8% Cobalt Acetylacetonate | 90.2% | A 9.0% | 30.0 |
| 1.0% Cobalt (III) Acetylacetonate | 90.0% | A 9.0% | 32.4 |
| 0.8% Cobalt Naphthenate | 90.2% | A 9.0% | 31.2 |
| 0.8% Cobalt Stearate | 90.2% | A 9.0% | 30.0 |
| 0.8% Cobalt (III) Acetylacetonate | 84.2% | B 15% | 26.5 |
| 0.8% Cobalt (III) Acetylacetonate | 84.2% | C 15% | 26.5 |
| 0.8% Cobalt (III) Acetylacetonate | 90.2% | D 9.0% | 31.7 |

EXAMPLE 3 — Lithium, Molybdenum and Aluminum Compounds

The effectiveness of lithium, molybdenum, and aluminum compounds as additives to increase the oxygen index substantially of polypropylene compositions utilizing flame retardant packages containing an antimony compound is demonstrated by examples involving lithium stearate, molybdenum (VI) acetylacetonate, and aluminum palmitate.

Table 4 consists of compositions tested in the manner hereinabove described.

Table 4

Aluminum, Lithium, and Molybdenum

| Compound and % by Weight | Polypropylene and E, % by Weight | Flame Retardant Package Containing an Antimony Compound Designated by Letter and % by Weight | Oxygen Index |
| --- | --- | --- | --- |
| 1% Aluminum Palmitate | 90.0% | A 9.0% | 29.4 |
| 1% Lithium Myristate | 90.0% | A 9.0% | 28.4 |
| 1% Molybdenum (VI) Acetylacetonate | 90.0% | A 9.0% | 28.4 |
| 0 | 91.0% | A 9.0% | 27.9 |
| 0 | 73.0% | A 27% | 31.7 |

EXAMPLE 4 — Other Resin Systems: Polystyrene, Polyester, Polyethylene, Copolymers of Ethylene and Propylene Although having the ability to act as effective flame retardant additives by significantly increasing the oxygen index of polypropylene compositions containing polypropylene and A, B, C, or D, metal additives may not have a similar effect in other polymeric resin systems. This is demonstrated by the fact that neither zinc nor cobalt salts were effective in polystyrene, polyester, or polyethylene. The result with respect to polyethylene is particularly striking in that the chemical similarity of polyethylene to polypropylene is such as might lead one to expect a priori that there would be a similar effectiveness as to oxygen index in each with respect to a particular flame retardant additive. Note, however, that in crystalline propylene dominated propylene-ethylene copolymers comprising a propylene homopolymer attached to a copolymer, metal additives of zinc, cobalt, lithium, aluminum, or molybdenum are effective.

The metal deactivator GI09-367 was found to be effective as a flame retardant additive in polystyrene, polyethylene, polypropylene, and copolymers of propylene and ethylene; but ineffective in polyester.

These results are summarized in Table 5.

The polystyrene of Table 5 had a number average molecular weight in the range 45,000–48,000, an average of weight average molecular weight of approximately 225,000, a melt flow of approximately 4.5g/10 min.

The polyethylene of Table 5 had a weight average molecular weight of approximately 80,000, a number average molecular weight of approximately 9,000, and a flow rate of approximately 5.5g/10 min.

The ethylene-propylene copolymer of Table 5 is a crystalline propylene dominated ethylene-propylene copolymer comprising a propylene homopolymer attached to a copolymer containing approximately 4% ethylene, and having a weight average molecular weight in the range 500,000–550,000, a number average molecular weight of approximately 80,000, and a melt flow index in the range of 4.0–6.5g/10 min.

Hytrel 4055 polyester (Du Pont) has the following physical properties:

| Property | ASTM Test | Unit | Value |
| --- | --- | --- | --- |
| Shore Hardness A/D | D-2240 | — | 92/40 |
| Specific Gravity | D-792 | — | 1.17 |
| Bulk Density (as Pellets) | | lbs/ft$^3$ | 43.7 |
| Tensile Strength | D-412 | lbs/in$^2$(Kg/cm$^2$) | 5900 (415) |
| Elongation at Breat | D-412 | % | 805 |
| Stress at 10% Elongation | D-638 | lbs/in$^2$(Kg/cm$^2$) | 650 (45.5) |
| Stress at 100% Elongation | D-412 | lbs/in$^2$(Kg/cm$^2$) | 925 (65) |
| Stress at 300% Elongation | D-412 | lbs/in$^2$(Kg/cm$^2$) | 1200 (84) |
| Tear Strength, Graves | D-624 | lbs/in (Kg/cm) | 700 (124) |
| Tear Strength, Split | D-470 | lbs/in (Kg/cm) | 170 (30) |
| Abrasion Resistance | D-1630 | % of Std. | 800 |
| Compression Set 22 Hrs./70° C | D-395 Method B | % | 60 |
| Melting Point | D-2117 | ° F (° C) | 334 (168) |
| Melt Index | D-1238* | 8/10 min. | 4.8 |

All melt flow indexes, unless otherwise expressly stated, were determined per ASTM D-1238 following Procedure A and Condition L.

Number average molecular weight (Mn) is defined by the formula:

$$Mn = W/N$$

where
W = total weight of the sample, and
N = number of individual molecules present in said sample.

Weight average molecular weight (Mw) is defined by the formula:

$$Mw = \Sigma M_i^2 A_i / \Sigma A_i$$

where
Mi = molecular weight of species $i$, and
Ai = number of molecules belonging to species $i$.

Note only the ethylene-propylene copolymer composition contains the stabilization package E.

Table 5

The Effect of Metal Salts and Metal Deactivators on the Fire Retardancy of Polystyrene, Polyester, Polyethylene and Copolymers of Propylene and Ethylene

| Polystyrene % by weight | A % by weight | Additive % by weight | Oxygen Index |
|---|---|---|---|
| 91 | 9 | 0 | 20.9 |
| 90.2 | 9 | Zinc Stearate .8 | 20.9 |
| 90.2 | 9 | Cobalt Stearate .8 | 20.2 |
| 90 | 9 | GI09-367 1 | 22.3 |
| Hytrel 4055 Polyester (Du Pont) | A | Additive | Oxygen Index |
| 91 | 9 | 0 | 27.9 |
| 90.2 | 9 | Cobalt Stearate .8 | 27.0 |
| 90 | 9 | GI09-367 1 | 26.5 |
| Polyethylene | A | Additive | Oxygen Index |
| 91 | 9 | 0 | 23.8 |
| 90.2 | 9 | Cobalt Stearate .8 | 23.8 |
| 90 | 9 | GI09-367 1 | 25.8 |
| Ethylene-Propylene Copolymer | | | |
| 100 | 0 | 0 | 18.2 |
| 91 | 9 | 0 | 28.4 |
| 90.2 | 9 | Zinc Stearate 0.8 | 32.4 |
| 90.2 | 9 | Cobalt Stearate 0.8 | 31.2 |
| 90.2 | 9 | GI09-367 1.0 | 30.5 |

EXAMPLE 5

The effectiveness of metal deactivators as additives to increase the oxygen index substantially of polypropylene compositions utilizing flame retardant packages containing an antimony compound is demonstrated by the following metal deactivators: GI09-367 and Mark 1475 as shown in Table 6.

Table 6

| Metal Deactivator and % by Weight | Polypropylene and E, % by Weight | Flame Retardant Package Containing an Antimony Compound Designated by Letter and % by Weight | Oxygen Index |
|---|---|---|---|
| 1% GI09-367 | 90% | A 9.0% | 29.4 |
| 1% Mark 1475 | 90% | A 9.0% | 30.0 |
| 0 | 91% | A 9.0% | 27.9 |
| 0 | 73% | A 27% | 31.7 |

EXAMPLE 6

That a metal deactivator and a metal additive (as heretofore defined) may be used together to substantially increase the oxygen index of polymer resins utilizing a flame retardant package containing an antimony compound is shown by Table 7. The polypropylene, E, and A are in weight percent approximately 90.04%, 0.76%, and 9%, respectively.

Table 7

| Metal Deactivator and Cobalt (III) Acetylacetonate | | | |
|---|---|---|---|
| Co (III) Acetyl- acetonate | GI09-367 | Polypropylene and E + A | Oxygen Index |
| 0.2% | 0% | 99.8% | 28.4 |
| 0.2% | 0.2% | 99.6% | 30.0 |
| 0.4% | 0% | 99.6% | 30.0 |
| 0.4% | 0.2% | 99.4% | 31.2 |
| 0.6% | 0% | 99.4% | 30.5 |
| 0.6% | 0.2% | 99.2% | 31.7 |
| 0.8% | 0% | 99.2% | 30.0 |
| 0.8% | 0.2% | 99% | 32.4 |

The structure of GI09-367 has been determined to be:

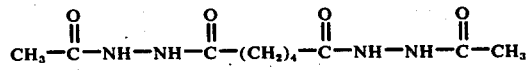

A chemical name for this compound is N,N'-diacetyl-adipic acid dihydrazide.

Other compounds having a similar usefulness as flame retardant additives are:
N,N'-bis-β-naphthoyl-sebacic acid dihydrazide,
N,N'-dipropionyl-terephthalic acid dihydrazide,
N,N'-dipelargonyl-terephthalic acid dihydrazide,
N,N'-di-2-ethylhexanoyl-terephthalic acid dihydrazide,
N,N'-dilauroyl-terephthalic acid dihydrazide,
N,N'-distearoyl-terephthalic acid dihydrazide,
N,N'-di-p-(tert.-octyl)-benzoyl-terephthalic acid dihydrazide,
N,N'-di-p-(octoxy)-benzoyl-terephthalic acid dihydrazide,
N,N'-di-tridecanoyl-terephthalic acid dihydrazide,
N,N'-dipalmitoyl-terephthalic acid dihydrazide,
N,N'-divaleroyl-terephthalic acid dihydrazide, N,N'-dibutyroyl-isophthalic acid dihydrazide,
N,N'-dipelargonyl-isophthalic acid dihydrazide,
N,N'-dicyclohexanoyl-isophthalic acid dihydrazide,
N,N'-di-2-chlorobenzoyl-oxalic acid dihydrazide,
N,N'-bis-2,4-dichlorobenzoyl-sebacic acid dihydrazide,
N-benzoyl-N'-butyroyl-oxalic acid dihydrazide,
N-benzoyl-N'-pelargonyl-oxalic acid dihydrazide,
N,N'-bis-(3,5-di-tert.-butyl-4-hydroxybenzoyl)-oxalic acid dihydrazide,
N,N'-bis-[3-(3,5-di-tert.-butyl-4-hydroxyphenyl)-propionyl]-adipic acid dihydrazide,
N,N'--dipropionyl-oxalic acid dihydrazide,
N,N'-dibutyroyl-oxalic acid dihydrazide,
N,N'-dipelargonyl-oxalic acid dihydrazide,
N,N'-diacetyl-carbohydrazide,
N,N'-dicyclohexanoyl-oxalic acid dihydrazide,
N,N'-diphenylacetyl-oxalic acid dihydrazide,
N,N'-dibenzoyl-oxalic acid dihydrazide,
N,N'-di-α-naphthoyl-oxalic acid dihydrazide,
N,N'-di-o-toluoyl-oxalic acid dihydrazide,
N,N'-di-p-methoxybenzoyl-oxalic acid dihydrazide,
N,N'-dicaproyl-oxalic acid dihydrazide,
N,N'-dicapryloyl-oxalic acid dihydrazide,
N,N'-diacetyl-succinic acid dihydrazide,
N,N'-dipropionyl-adipic acid dihydrazide,
N,N'-diacetyl-sebacic acid dihydrazide, and
N,N'-dibenzoyl-sebacic acid dihydrazide.
These compounds have the formula:

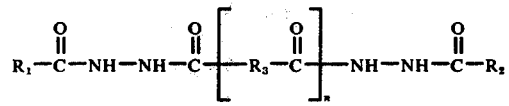

in which

R₁ and R₂ independent of one another represent: an alkyl with 1 to 17 carbon atoms, cyclohexyl, arylalkyl possibly substituted by one or two alkyl groups with 1 to 4 carbon atoms in each case and/or a hydroxyl group; phenyl, chlorophenyl, dichlorophenyl, phenyl possibly substituted by one or two alkyl groups with 1 to 4 carbon atoms in each case and/or a hydroxyl group, alkylphenyl with 7 to 14 carbon atoms, alkoxy phenyl with 7 to 24 atoms or naphthyl, R₃ represents: the direct bond, an alkylene group with 1 to 8 carbon atoms, a phenylene group or a naphthylene group and $n$ is 0 or 1.

Compounds useful as flame retardant additives are:

| Name of Compound followed by Structure | Melting Point (° C) |
|---|---|
| N-(1,2,4-triazol-3-yl)salicylamide [Mark 1475] | 307–309 |
| 5,5'-(Methylene bis-N,N'-(1,2,4-triazol-3-yl) disalicylamide | > 330 |
| 4-t-octyl-N-(1,2,4-triazol-3-yl)-salicylamide | 316–321 |
| N-(5-(2-(3,5-di-t-butyl-4-hydroxyphenyl)-ethyl 1,2,4-triazol-3-yl)-salicylamide | 264–267 |
| N-(1,2,4-triazol-3-yl)-o-anisamide | |

| Name of Compound followed by Structure | Melting Point (° C) |
|---|---|
| 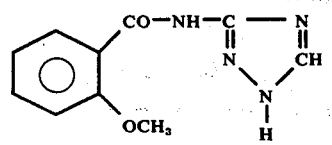 | 263–265 |
| Methyl 3-(3-salicylamido-1H-1,2,4-triazol-3-yl) propionate 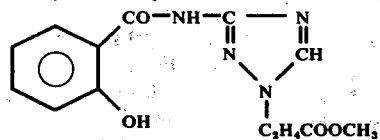 | 155–158 |
| Thiodi-3,3'-bis(N'-salicyloyl hydrazide) of propionic acid 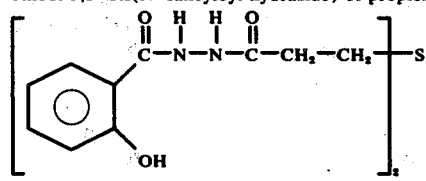 | 225–227 |
| 5,5'-(methylenebis(salicyloyldiiminocarbonyl-1,2-ethylidenethio-1,2-ethylidene carbonyl)) disalicyloyl hydrazide 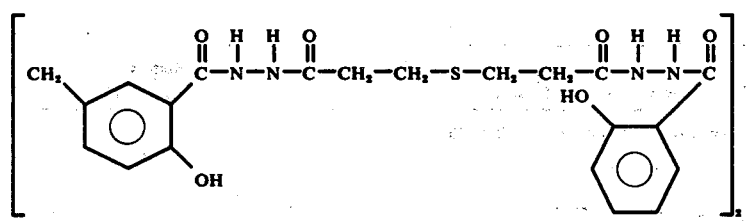 | 212–218 |
| 3-(3-salicylamido-1H-1,2,4-triazol-4-yl) pentanoic acid 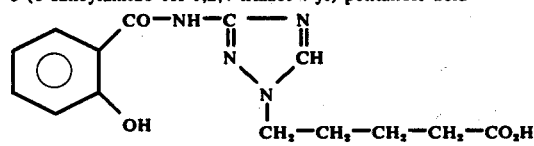 | |

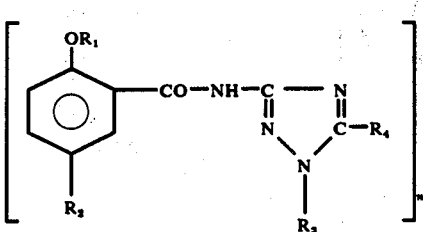

where $R_1$ is either a hydrogen or a monovalent alkyl radical of up to 10 carbon atoms, $R_2$ is either a divalent alkyl radical of up to 10 carbon atoms, when $n$ is 2, or monovalent alkyl radical of up to 10 carbon atoms when $n$ is 1, $R_3$ is either a hydrogen, a monovalent alkyl radical, alkyl acid, or alkyl ester, wherein all alkyl groups are connected so as to form a nitrogen to carbon bond and wherein all alkyl groups contain up to 10 carbon atoms, $R_4$ is an alkyl radical containing up to 10 carbon atoms or a phenyl radical substituted with no more than three alkyl groups containing up to 10 carbon atoms, and no more than one hydroxy group, and $n$ is 1 or 2.

The specific examples of this invention are illustrative only and should not be limiting in the light of the variations thereon which are within the intended scope of this invention and apparent to one skilled in the relevant art once this disclosure is made known.

That which is claimed is:

1. The method for efficiently reducing the flammability of compositions comprising a polymer selected from the group consisting of polypropylene, and ethylene-propylene copolymers and a flame retardant package comprising antimony trioxide and at least one polyhalogenated organic compound, wherein the halogen is selected from the group consisting of chlorine and bromine, by the step of incorporating therein in quantities sufficient to produce a measurable effect in the oxygen index for said compositions at least one compound, free of water of hydration, which is selected from the group consisting of a cobalt salt of an organic acid or an acetylacetonate complex thereof and a lithium salt of an organic acid and molybdenum acetylacetonate.

2. The composition comprising: a. a polymer selected from the group consisting of propylene and crystalline propylene dominated propylene-ethylene copolymers comprising a propylene homopolymer attached to a copolymer, b. a flame retardant package comprising antimony trioxide and at least one polyhalogenated organic compound, wherein the halogen is selected from the group consisting of bromine and chlorine, and c. an additive, in quantities sufficient to produce a measureable effect in the oxygen index for said composition to increase the efficiency of said flame retardant package, comprising a compound selected from the group consisting of a cobalt salt of an organic acid and an acetylacetonate complex thereof and a lithium salt of an organic acid and molybdenum acetylacetonate, wherein said additive is free of any water of hydration.

3. The composition of claim 2, wherein said cobalt salt of an organic acid is selected from the group consisting of cobalt stearate and cobalt naphthenate.

4. The composition of claim 2 wherein the cobalt acetylacetonate complex is cobalt (III) acetylacetonate.

5. The composition of claim 2, wherein said lithium salt of an organic acid is lithium stearate.

6. The composition of claim 2, wherein the flame retardant package comprises at least three components:
  a. the first said component is antimony trioxide having a percent by weight based upon said composition in the range of about 2–30%,
  b. the second said component contains a compound selected from the group consisting of brominated organic compounds having a weight percent based upon said composition in the range of about 3–40%, and
  c. the third said component contains a compound selected from the group consisting of chlorinated organic compounds having a weight percent based upon said composition in the range of about 1–10%, wherein said chlorinated and brominated compounds are substantially non-volatile from within the selected polymer matrix at the approximate melting point of said selected polymer, have a molecular weight above 200, and a halogen percent by weight in the range 35–93%.

7. The composition of claim 6, wherein the second component of brominated organic compounds is selected from the group consisting of hexabromocyclododecane, tetrabromophthalic anhydride, and tetrabromoterephthalic acid, and wherein the third component of chlorinated organic compounds is selected from the group consisting of chlorinated paraffins.

8. The composition of claim 2, wherein said additive has a percent by weight based upon said composition in a range of about 0.01–10.0%.

9. The composition of claim 2, wherein the halogenated compound is selected from the group consisting of hexabromocyclododecane, tetrabromophthalic anhydride, tetrabromoterephthalic acid, and a chlorinated paraffin.

10. The composition comprising: a. a polymer selected from the group consisting of polypropylene and crystalline propylene dominated propylene-ethylene copolymers comprising a propylene homopolymer attached to a copolymer, b. a flame retardant package comprising antimony trioxide and at least one polyhalogenated organic compound, wherein the halogen is selected from the group consisting of bromine and chlorine, and c. an additive in quantities sufficient to produce a measurable effect in the oxygen index for said composition to increase the efficiency of said flame retardant package comprising a compound selected from the group consisting of zinc dibutyl dithiocarbamate, and zinc pentamethylene dithiocarbamate, wherein said additive is free of any water of hydration.

11. The composition comprising: a. a polymer selected from the group consisting of polystyrene, polyethylene, polypropylene and ethylene-propylene copolymers, b. a flame retardant package comprising antimony trioxide and at least one polyhalogenated organic compound, wherein the halogen is selected from the group consisting of chlorine and bromine, and c. an additive in quantities sufficient to produce a measurable effect in oxygen index for said composition to increase the efficiency of said flame retardant package comprising a compound selected from the group consisting of N,N'-bis-β-naphthoyl-sebacic acid dihydrazide, N,N'-dipropionyl-tetrephthalic acid dihydrazide, N,N'-dipelargonyl-terephthalic acid dihydrazide, N,N'-di-2-ethylhexanoyl-terephthalic acid dihydrazide, N,N'-dilauroyl-terephthalic acid dihydrazide, N,N'-distearoyl-terephthalic acid dihydrazide, N,N'-di-p-(tert-octyl)-benzoyl-terephthalic acid dihydrazide, N,N'-di-p-(octoxy)-benzoyl-terephthalic acid dihydrazide, N,N'-di-tridecanoyl-terephthalic acid dihydrazide, N,N'-dipalmitoylterephthalic acid dihydrazide, N,N'-divaleroyl-terephthalic acid dihydrazide, N,N'-dibutyroyl-isophthalic acid dihydrazide, N,N'-dipelargonylisophthalic acid dihydrazide, N,N'-dicyclohexanoyl-isophthalic acid dihydrazide, N,N'-di-2-chloro-benzoyl-oxalic acid dihydrazide, N,N'-bis-2,4-dichloro-benzoyl-sebacic acid dihydrazide, N-benzoyl-N'-butyroyloxalic acid dihydrazide, N-benzoyl-N'-benzoyl-N'-pelargonyl-oxalic acid dihydrazide, N,N'-bis-(3,5-di-tert.-butyl-4-hydroxybenzoyl)-oxalic acid dihydrazide, N,N'-bis-(3-(3,5-di-tert.-butyl-4-hydroxyphenyl)-propionyl)-adipic acid dihydrazide, N,N'-dipropionyl-oxalic acid dihydrazide, N,N'-dibutyroyl-oxalic acid dihydrazide, N,N'-dipelargonyl-oxalic acid dihydrazide, N,N'-dicyclohexanoyl-oxalic acid dihydrazide, N,N'-diphenylacetyl-oxalic acid dihydrazide, N,N'-dibenzoyl-oxalic acid dihydrazide, N,N'-di-α-naphthoyl-oxalic acid dihydrazide, N,N'-di-o-toluoyl-oxalic acid dihydrazide, N,N'-di-p-methoxybenzoyl-oxalic acid dihydrazide, N,N'-dicaproyl-oxalic acid dihydrazide, N,N'-diacetylsuccinic acid dihydrazide, N,N'-diacetyl-adipic acid dihydrazide, N,N'-dipropionyl-adipic acid dihydrazide, N,N'-di-acetyl-sebacic acid dihydrazide, N,N'-dibenzoyl-sebacic acid dihydrazide, 5,5'-(methylene bis-N,N'-(1,2,4-triazol-3-yl)) disalicylamide, 4-t-octyl-N-(1,2,4-triazol-3-yl) salicylamide, N-(5-(2-(3,5-di-t-butyl-4-hydroxyphenyl)ethyl 1,2,4-triazol-3-yl)-salicylamide, methyl 3-(3-salicylamido-1H-1,2,4-triazol-3-yl) propionate, thiodi-3,3'-bis(N'-salicyloyl hydrazide) of propionic acid, 5,5'-(methylene bis (salicyloyl diiminocarbonyl-1,2-ethylidenethio-1,2-ethylidene carbonyl))-disalicyloyl hydrazide, N-(1,2,4-triazol-3-yl) salicylamide, N-(1,2,4-triazol-3-yl)-o-anisamide, 3-(3-salicylamido-1H-1,2,4-triazole-4-yl) pentanoic acid, and N,N'-diacetylcarbohydrazide.

12. The composition of claim 11, wherein the additive has a percent by weight based upon said composition in a range of about 0.01–10.0%.

13. The composition comprising: a. a polymer selected from the group consisting of polystyrene, polyethylene, polypropylene, and ethylene-propylene copolymers, b. a flame retardant package comprising antimony trioxide and at least one polyhalogenated organic compound, wherein the halogen is selected from the group consisting of chlorine and bromine, and c. an additive in quantities sufficient to produce a measurable effect in oxygen index for said composition to increase the efficiency of said flame retardant package comprising a substituted hydrazine of the formula:

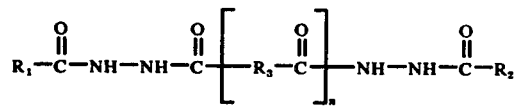

in which
R$_1$ and R$_2$ are independently selected from the group consisting of straight, branched, and cyclic aliphatic alkyl groups containing up to 20 carbon atoms; unsubstituted phenyl radicals; phenyl radicals substituted by not more than 2 alkyl radicals containing up to 6 carbon atoms; hydroxyphenyl radicals substituted by 0 to 2 alkyl radicals containing up to 6 carbon atoms; phenyl radicals substituted by 1 to 2 halogen atoms; phenyl radicals substituted by an alkoxide radical containing up to 6 carbon atoms; and a naphthalene radical,
R$_3$ is selected from the group consisting of a direct bond, an alkylene group containing 1 to 8 carbon atoms, a phenyl group, and a naphthalene group, and
$n$ is 0 or 1.

14. The composition comprising: a. a polymer selected from the group consisting of a polystyrene, a polyethylene, a polypropylene and an ethylene-propylene copolymer, b. a flame retardant package comprising antimony trioxide and at least one polyhalogenated organic compound, wherein the halogen is selected from the group consisting of chlorine and bromine, and c. an additive in quantities sufficient to produce a measurable effect in oxygen index for said composition to increase the efficiency of said flame retardant package comprising a compound selected from the group of compounds which are known as metal deactivators containing the chemical structure of substituted 3-amino-1,2,4-triazole amides given by the formula:

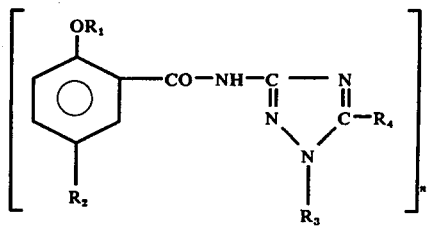

where
$n$ is 1 or 2,
R$_1$ is either a hydrogen or a monovalent alkyl radical of up to 10 carbon atoms,
R$_2$ is either a hydrogen or a monovalent alkyl radical of up to 10 carbon atoms when $n$ is 1, or divalent alkyl radical of up to 10 carbon atoms when $n$ is 2,
R$_3$ is either a hydrogen, a monovalent alkyl radical, an alkyl acid radical, or alkyl ester radical, wherein all alkyl groups are connected so as to form nitrogen to carbon bonds and wherein all alkyl groups contain up to 10 carbon atoms,
R$_4$ is a monovalent alkyl or phenyl radical substituted with no more than three alkyl groups containing up to 10 carbon atoms, and no more than one hydroxy group.

* * * * *

UNITED STATES PATENT OFFICE
CERTIFICATE OF CORRECTION

Patent No. 4,035,325          Dated   July 12, 1977

Inventor(s)   Wassily W. Poppe and Ivor R. Fielding

It is certified that error appears in the above-identified patent and that said Letters Patent are hereby corrected as shown below:

Column 3, line 35, "material" should read --materials--.

Column 6, line 68, "8/10 min" should read --g/10 min--.

Column 10, lines 43-48,

" 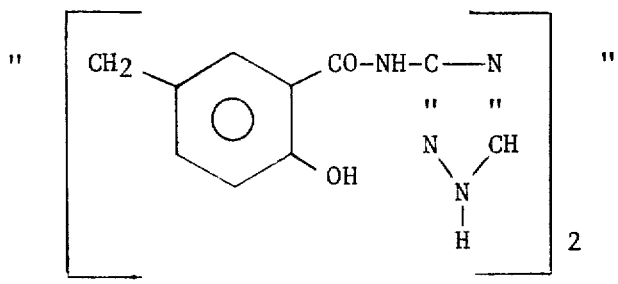 "

should read

UNITED STATES PATENT OFFICE
CERTIFICATE OF CORRECTION

Patent No. 4,035,325  Dated July 12, 1977

Inventor(s) Wassily W. Poppe and Ivor R. Fielding

It is certified that error appears in the above-identified patent and that said Letters Patent are hereby corrected as shown below:

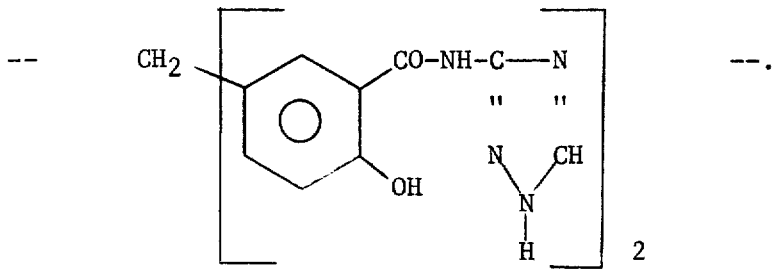

Column 11, line 11, "Methyl 3-(3-salicylamido-1H-1,2,4" should read --Methyl 3-(3-salicylamido-1H-1,2,4--.

UNITED STATES PATENT OFFICE
CERTIFICATE OF CORRECTION

Patent No. 4,035,325　　　　　　　Dated　July 12, 1977

Inventor(s)　Wassily W. Poppe and Ivor R. Fielding

It is certified that error appears in the above-identified patent and that said Letters Patent are hereby corrected as shown below:

Column 11, lines 29-35,

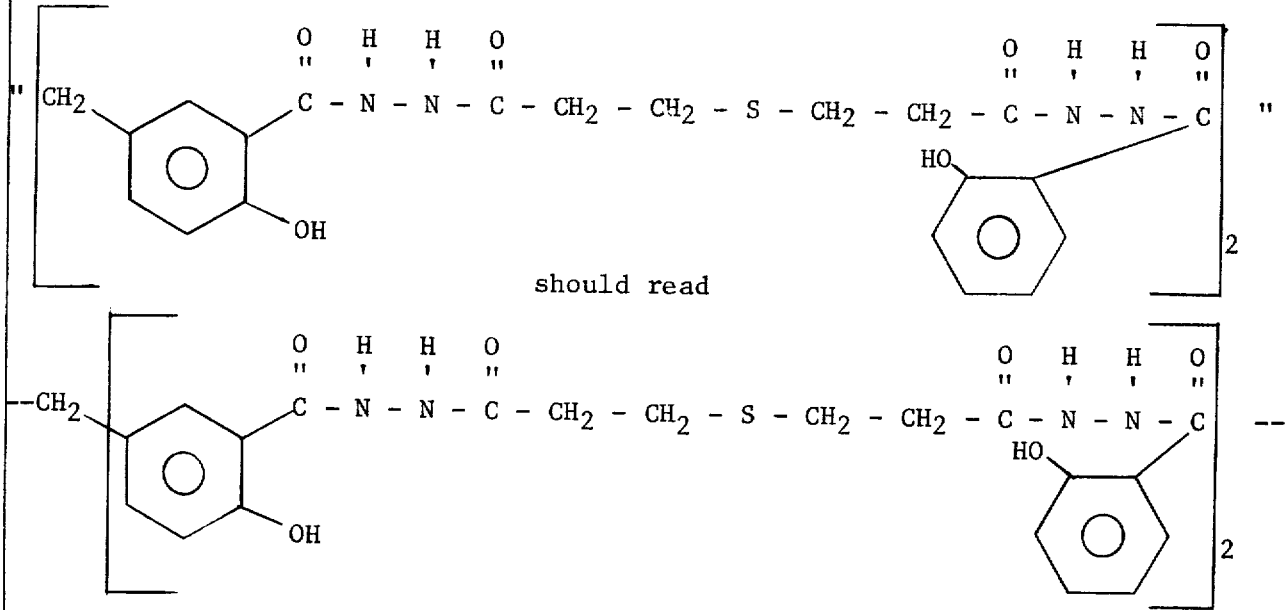

should read

UNITED STATES PATENT OFFICE
CERTIFICATE OF CORRECTION

Patent No. 4,035,325      Dated July 12, 1977

Inventor(s) Wassily W. Poppe and Ivor R. Fielding

It is certified that error appears in the above-identified patent and that said Letters Patent are hereby corrected as shown below:

Column 14, lines 37 & 38, "N-benzoyl-N'-benzoyl-N'-pelargonyl" should read --N-benzoyl-N'-pelargonyl--.

Column 14, line 63, "(3-salicylamido-1H" should read --(3-salicylamido-1H--.

Signed and Sealed this

Seventh Day of November 1978

[SEAL]

Attest:

RUTH C. MASON
*Attesting Officer*

DONALD W. BANNER
*Commissioner of Patents and Trademarks*